United States Patent Office.

HANS KUŽEL, OF HÖCHST-ON-THE-MAIN, GERMANY, ASSIGNOR TO THE FARB-WERKE, VORMALS MEISTER, LUCIUS & BRÜNING, OF SAME PLACE.

AZO DYE.

SPECIFICATION forming part of Letters Patent No. 458,283, dated August 25, 1891.

Application filed August 4, 1890. Serial No. 360,967. (Specimens.)

*To all whom it may concern:*

Be it known that I, HANS KUŽEL, doctor of philosophy, a citizen of the Empire of Germany, residing at Höchst-on-the-Main, in the Empire of Germany, have invented certain new and useful Improvements in Coloring-Matter; and I do hereby declare the following to be a full, clear, and exact description of the invention, such as will enable others skilled in the art to which it appertains to make and use the same.

In my application for Letters Patent (Serial No. 360,968) I have described my process for the production of a new dioxynaphthaline disulphonic acid and this novel body itself. This novel body is derived from a new naphthol trisulphonic acid or its anhydride, which is described in the German Letters Patent No. 56,058, recently published. This new dioxynaphthaline disulphonic acid differs essentially from the known isomeric dioxynaphthaline disulphonic acid of the German Letters Patent No. 40,893, which is derived from another naphthol trisulphonic acid and has other properties, viz: A solution of it turns to reddish-violet on the addition of a solution of chloride of lime, and on combination with diazo bodies no other than brown azo coloring-matters are formed.

My invention relates to the manufacture of azo coloring-matter ranging in color from bluish-red to violet, derived from the herein-described diazonaphthaline disulphonic acid, characterized, as above mentioned, by combining said acid or its salts with diazo bodies and adapted for dyeing wool in greatly differing shades of color, depending upon the use of acids, such as sulphuric acid or bisulphates or acids in combination with metallic mordants, such as alum, chrome alum, or alkaline chromates.

In practically carrying out my invention I proceed as follows:

*Example I.*—Ninety-three parts, by weight, of aniline are diazotized in the usual manner with 267.7 parts, by weight, of hydrochloric acid of thirty per cent., and sixty-nine parts, by weight, of sodium nitrite and at a temperature between 0° and 5° centigrade, and while stirring well introduced into a paste prepared from four hundred and four parts, by weight, of the disodium salt of the new dioxynaphthaline disulphonic acid and three hundred and forty parts, by weight, of acetate of soda. The coloring-matter, a large part of which separates of itself, is precipitated by means of common salt, pressed off, and dried.

*Example II.*—Two hundred and forty-five parts, by weight, of naphthionate of soda are diazotized in the usual manner with 267.7 parts, by weight, of hydrochloric acid of thirty per cent., and sixty-nine parts, by weight, of sodium nitrite and at a low temperature, and while stirring well mixed with a solution of four hundred and four parts, by weight, of the disodium salt of the new dioxynaphthaline disulphonic acid and one hundred and thirty-five parts, by weight, of soda, or eighty parts, by weight, of caustic soda in about three thousand parts, by weight, of water. After some hours' standing the coloring-matter separates in gelatinous form. It is precipitated by means of common salt, filtered off, and dried.

For the diazo bodies mentioned in the examples can be substituted the diazo bodies derived from the following bases and amido-sulphonic acids: as mono-xylidine, xyli-cumidine, alpha-naphthylamine, beta-naphthylamine, amidoazobenzole, amidoazotoluol, sulphanilic acid, metanilic acid, toluidine sulphonic acid, amidonaphthol sulphonic acid, (R,) amidonaphthol sulphonic acid, (G,) as mono-xylidine sulphonic acid, beta-naphthylamine sulphonic acid, (Brönner,) alpha-naphthylamine disulphonic acid, (Dahl,) beta-naphthylamine disulphonic acid, (G,) beta-naphthylamine disulphonic acid, (R,) beta-naphthylamine trisulphonic acid, naphthalidine sulphonic acid, amidoazobenzole sulphonic acid, mono-nitraniline, para-nitraniline, mono-amidobenzoic acid, ortho-amidosalicylic acid, para-amidosalicylic acid, amidopara-oxybenzoic acid, ortho-phenetidine, para-phenetidine, ortho-anisidine, para-anisidine, ortho-amido-para-cresolmethylether, amidonaphtholmethylether, benzidine, toulidine, diethoxybenzidine, dimethoxybenzidine, mono-diamidodiphenic acid, or another amine or its sulphonic or carbonic acid.

The coloring-matter thus produced is in form of a brown powder, very easily soluble in water with blue-red coloring, easily soluble in diluted acids, copiously soluble in hot alcohol of 75° Tralles, insoluble in ether and ligroine.

The new coloring-matter is the first having the property of dyeing wool of greatly different shades, which will resist the influence of light and of alkali, so as to permit of their employment for industrial purposes. On being dyed with sulphuric acid the shade obtained is a blue-red. If to the dye-bath are added mordants, such as alum, together with the acid, or after that the color is fixed on the fiber by means of the acid, the shade will be a dark-claret with vivid reflection. The same will be the case when are added copper chloride or sulphate. On the addition of chrome-alum is obtained a dark violet. On the addition of alkali chromates a deep black is produced. By this characteristic property the new azo coloring-matter differs from all the azo coloring-matters known before, with which could not be produced more than one suitable shade, and which, like the coloring-matter of the German Letters Patent No. 40,893, do not produce a black on the addition of chromate of potash, as the chromate destroys the coloring-matter.

The formula of the coloring-matter is expressed by

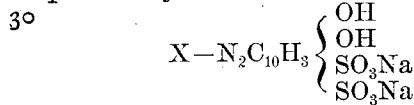

Having thus described my invention and in what manner it can be performed, what I claim as new, and desire to secure by Letters Patent, is—

1. The process described for producing azo coloring-matter, which consists in diazotizing ninety-three parts of aniline with 267.7 parts of hydrochloric acid, thirty per cent., and sixty-nine parts of sodium nitrite, (all by weight,) at a temperature between 0° and 5° centigrade, and while stirring introducing it into a paste made from four hundred and four parts of the disodium salt of the herein-described naphthaline disulphonic acid and three hundred and forty parts of acetate of soda, (all parts by weight,) and finally precipitating the color by means of common salt, filtering, and drying it, as and for the purpose specified.

2. The azo coloring-matter derived from the herein-described dioxynaphthaline disulphonic acid, which is a brown powder easily soluble in cold water and diluted acids, freely soluble in hot alcohol of 75° Tralles, insoluble in ether and ligroine, and adapted for dyeing wool in greatly differing shades, ranging from bluish red to deep black, depending upon the use of acids, or the latter in combination with metallic mordants, as set forth.

In testimony whereof I affix my signature in presence of two witnesses.

HANS KUŽEL.

Witnesses:
JOSEF REVERDY,
HEINRICH HAHN.